(12) United States Patent
Lin (10) Patent No.: US 10,598,870 B2
(45) Date of Patent: Mar. 24, 2020

(54) FIBER OPTIC CONNECTOR WITH DUAL MULTI-FIBER FERRULES, AND CABLE ASSEMBLIES AND SYSTEMS INCLUDING THE SAME

(71) Applicant: Alliance Fiber Optic Products, Inc., Sunnyvale, CA (US)

(72) Inventor: Yen Hsu Lin, New Taipei (TW)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 15/428,189

(22) Filed: Feb. 9, 2017

(65) Prior Publication Data

US 2017/0227720 A1 Aug. 10, 2017

Related U.S. Application Data

(60) Provisional application No. 62/389,436, filed on Feb. 9, 2016.

(51) Int. Cl.
*G02B 6/38* (2006.01)

(52) U.S. Cl.
CPC ......... *G02B 6/3893* (2013.01); *G02B 6/3821* (2013.01); *G02B 6/3825* (2013.01); *G02B 6/3879* (2013.01); *G02B 6/3881* (2013.01); *G02B 6/3883* (2013.01); *G02B 6/3885* (2013.01); *G02B 6/3887* (2013.01)

(58) Field of Classification Search
CPC .. G02B 6/3893; G02B 6/3821; G02B 6/3825; G02B 6/3879; G02B 6/3881; G02B 6/3883; G02B 6/3885; G02B 6/3887
See application file for complete search history.

(56) References Cited

U.S. PATENT DOCUMENTS

| | | | | |
|---|---|---|---|---|
| 5,283,848 A | * | 2/1994 | Abendschein | ....... G02B 6/3877 385/59 |
| 5,796,896 A | * | 8/1998 | Lee | ....................... G02B 6/3825 385/59 |

(Continued)

FOREIGN PATENT DOCUMENTS

| | | |
|---|---|---|
| EP | 1039322 A1 | 9/2000 |
| WO | 2001037010 A2 | 5/2001 |

OTHER PUBLICATIONS

Ellis, Russell, High Fiber Count Cable Miniaturization using SMF-28 Ultra 200 Fiber, White Paper, available at https://www.corning.com/media/worldwide/coc/documents/Fiber/RC-%20White%20Papers/WP-MetroAccess/wp8200_03-19-2015.pdf.*

(Continued)

*Primary Examiner* — Peter Radkowski
(74) *Attorney, Agent, or Firm* — Adam R. Weeks (57) ABSTRACT

A fiber optic connector includes first and second ferrules arranged next to each other. The first and second ferrules each have a plurality of bores configured to support respective optical fibers. The fiber optic connector also includes an inner connector body having a front end from which the first and second ferrules extend, a latch arm extending outwardly from the inner connector body, and an outer body having a housing portion in which the inner connector body is at least partially received and a handle extending rearwardly from the housing portion. The outer body can move relative to the inner connector body to cause the latch arm to flex toward the inner connector body.

19 Claims, 11 Drawing Sheets

(56) References Cited

U.S. PATENT DOCUMENTS

| | | | | | |
|---|---|---|---|---|---|
| 5,971,625 | A * | 10/1999 | Lu | .................. | G02B 6/3831 |
| | | | | | 385/55 |
| 6,146,023 | A * | 11/2000 | Weigel | .................. | G02B 6/3879 |
| | | | | | 385/139 |
| 6,259,856 | B1 * | 7/2001 | Shahid | .................. | G02B 6/3879 |
| | | | | | 385/147 |
| 6,331,079 | B1 * | 12/2001 | Grois | .................. | G02B 6/3821 |
| | | | | | 385/53 |
| 6,357,928 | B1 * | 3/2002 | Haley | .................. | G02B 6/3878 |
| | | | | | 385/59 |
| 6,422,760 | B1 * | 7/2002 | Matasek | .................. | G02B 6/3879 |
| | | | | | 385/53 |
| 6,461,053 | B1 * | 10/2002 | Mayercik | .................. | G02B 6/3825 |
| | | | | | 385/56 |
| 6,572,276 | B1 * | 6/2003 | Theis | .................. | G02B 6/387 |
| | | | | | 385/78 |
| 8,500,470 | B2 * | 8/2013 | Wang | .................. | G02B 6/4261 |
| | | | | | 385/53 |
| 8,641,293 | B2 * | 2/2014 | Lin | .................. | G02B 6/3898 |
| | | | | | 385/53 |
| 8,873,921 | B2 * | 10/2014 | Lee | .................. | G02B 6/3849 |
| | | | | | 385/134 |
| 8,998,505 | B2 * | 4/2015 | Motofuji | .................. | G02B 6/3879 |
| | | | | | 385/78 |
| 9,057,845 | B2 * | 6/2015 | Szilagyi | .................. | B29D 11/0075 |
| 9,086,546 | B2 * | 7/2015 | Jones | .................. | G02B 6/3825 |
| 9,146,351 | B2 * | 9/2015 | Hughes | .................. | G02B 6/241 |
| 9,494,744 | B2 * | 11/2016 | de Jong | .................. | G02B 6/3879 |
| 9,519,114 | B2 * | 12/2016 | Zimmel | .................. | G02B 6/3885 |
| 9,568,689 | B2 * | 2/2017 | Nguyen | .................. | G02B 6/389 |
| 2003/0063862 | A1 * | 4/2003 | Fillion | .................. | G02B 6/3825 |
| | | | | | 385/53 |
| 2004/0117981 | A1 * | 6/2004 | Roth | .................. | G02B 6/3821 |
| | | | | | 29/828 |
| 2009/0226140 | A1 * | 9/2009 | Belenkiy | .................. | G02B 6/3897 |
| | | | | | 385/134 |
| 2011/0019962 | A1 * | 1/2011 | Childers | .................. | G02B 6/3869 |
| | | | | | 385/76 |
| 2012/0177326 | A1 * | 7/2012 | Peng | .................. | G02B 6/3878 |
| | | | | | 385/65 |
| 2013/0183004 | A1 * | 7/2013 | Hughes | .................. | G02B 6/241 |
| | | | | | 385/77 |
| 2013/0209041 | A1 * | 8/2013 | Szilagyi | .................. | B29D 11/0075 |
| | | | | | 385/78 |
| 2013/0216188 | A1 * | 8/2013 | Lin | .................. | G02B 6/3893 |
| | | | | | 385/77 |
| 2013/0301994 | A1 * | 11/2013 | Motofuji | .................. | G02B 6/36 |
| | | | | | 385/78 |
| 2014/0147081 | A1 * | 5/2014 | Jones | .................. | G02B 6/3825 |
| | | | | | 385/78 |
| 2014/0331464 | A1 * | 11/2014 | Jiang | .................. | G02B 6/3893 |
| | | | | | 29/283 |
| 2014/0348468 | A1 * | 11/2014 | Lagziel | .................. | G02B 6/4255 |
| | | | | | 385/78 |

OTHER PUBLICATIONS

International Search Report and Written Opinion PCT/US2017/017098 dated Mar. 28, 2017.

* cited by examiner

FIBER OPTIC CONNECTOR WITH DUAL MULTI-FIBER FERRULES, AND CABLE ASSEMBLIES AND SYSTEMS INCLUDING THE SAME

RELATED APPLICATIONS

This application claims the benefit of priority under 35 U.S.C. § 119 of U.S. Provisional Application No. 62/389,436, filed on Feb. 9, 2016, the content of which is relied upon and incorporated herein by reference in its entirety.

BACKGROUND

This disclosure relates generally to fiber optic connectors, and more particularly to fiber optic connectors that include multiple, multi-fiber ferrules, such as MT ferrules. This disclosure also relates to cable assemblies, systems, and methods including such fiber optic connectors.

Optical fibers and copper wires are useful in a wide variety of applications, including the telecommunications industry for data transmission. In a telecommunications system that uses either of these data transmission elements, there are typically many locations where cables that carry the elements connect to equipment or other cables. Connectors are typically provided on the ends of the cables to conveniently provide these connections. The connectors are designed to be received in ports that align the optical fiber(s) carried by connectors with the optical fiber(s) of other connectors or with equipment (e.g., transceivers) so that data can be transmitted between the components.

The demand for high bandwidth tends to drive a need for high-density interconnects, i.e. a large number of optical connections in a given space. By increasing the number of optical connections, more data can be transmitted in the given space. It can be a challenge, however, to design fiber optic connectors cable of providing high-density interconnects. The fiber optic connectors often become more difficult to handle and less robust as components are made smaller.

SUMMARY

According to one embodiment of this disclosure, a fiber optic connector comprises first and second ferrules arranged next to each other. The first and second ferrules each have a plurality of bores configured to support respective optical fibers. The fiber optic connector also includes an inner connector body having a front end from which the first and second ferrules extend, a latch arm extending outwardly from the inner connector body, and an outer body having a housing portion in which the inner connector body is at least partially received and a handle extending rearwardly from the housing portion. The outer body can move relative to the inner connector body to cause the latch arm to flex toward the inner connector body. For example, the outer body may be movable between a forward position in which the housing portion does not flex the latch arm and a rearward position in which the housing portion flexes the latch arm toward the inner connector body.

Fiber optic connectors in this disclosure, like the one summarized above, may be provided as part of a cable assembly. As an example, a cable assembly may include a fiber optic cable having a plurality of optical fibers. The cable assembly may also include the fiber optic connector mounted on the fiber optic cable. At least a first group of the plurality of optical fibers are supported by the plurality of bores in the first ferrule of the fiber optic connector, and at least a second group of the plurality of optical fibers are supported by the plurality bores in the second ferrule.

Fiber optic connectors in this disclosure, like the one summarized above, may also be provided together with an adapter as part of a fiber optic connector system. The adapter may include an adapter body having a passage into which the fiber optic connector can be inserted. The latch arm of the fiber optic connector is configured to engage the adapter body to retain the fiber optic connector in the passage of the adapter body. In some embodiments, the adapter body may include opposed first and second ends, and the passage extends through the adapter body between the opposed first and second ends. The fiber optic connector can then be inserted into the passage of the adapter body from either of the opposed first and second ends.

Additional features and advantages will be set forth in the detailed description which follows, and in part will be readily apparent to those skilled in the technical field of optical communications. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
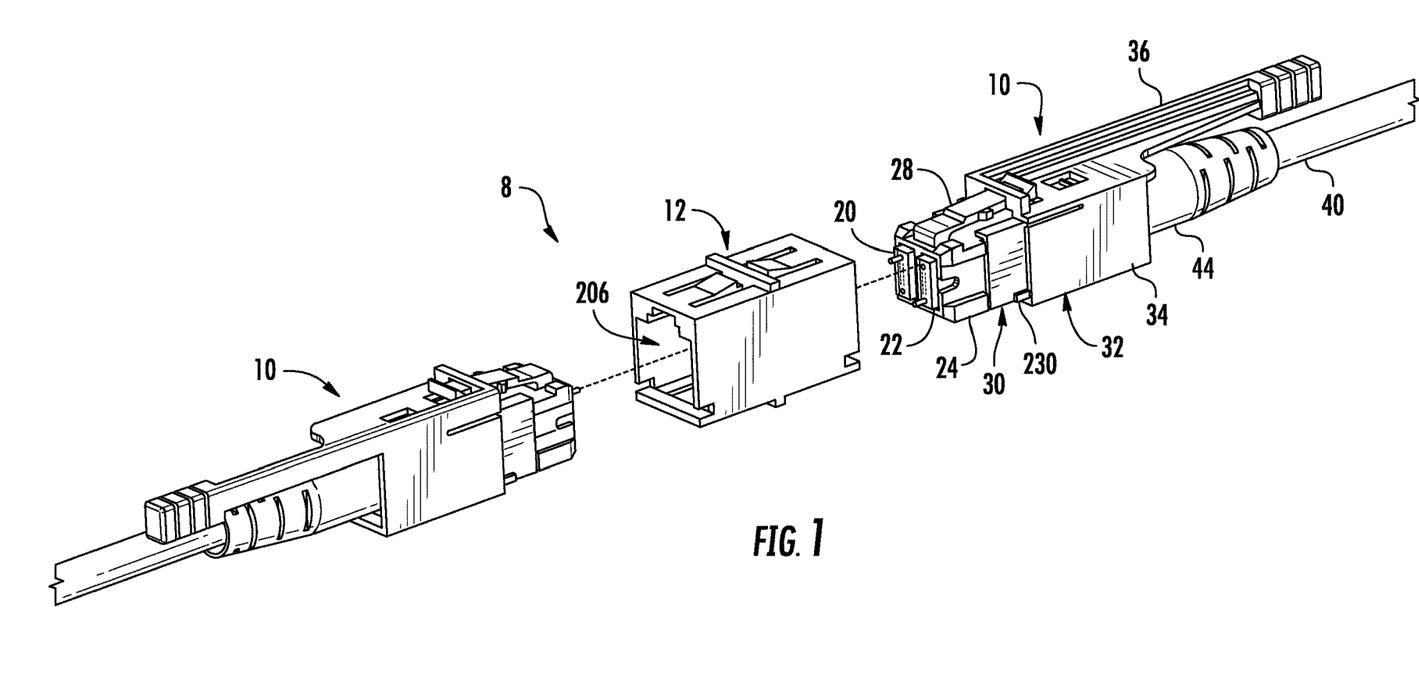
FIG. 1 is a perspective view of one embodiment of a fiber optic connector system that includes at least one fiber optic connector and an adapter, wherein two of the fiber optic connectors are shown removed from the adapter.
Figure 2:
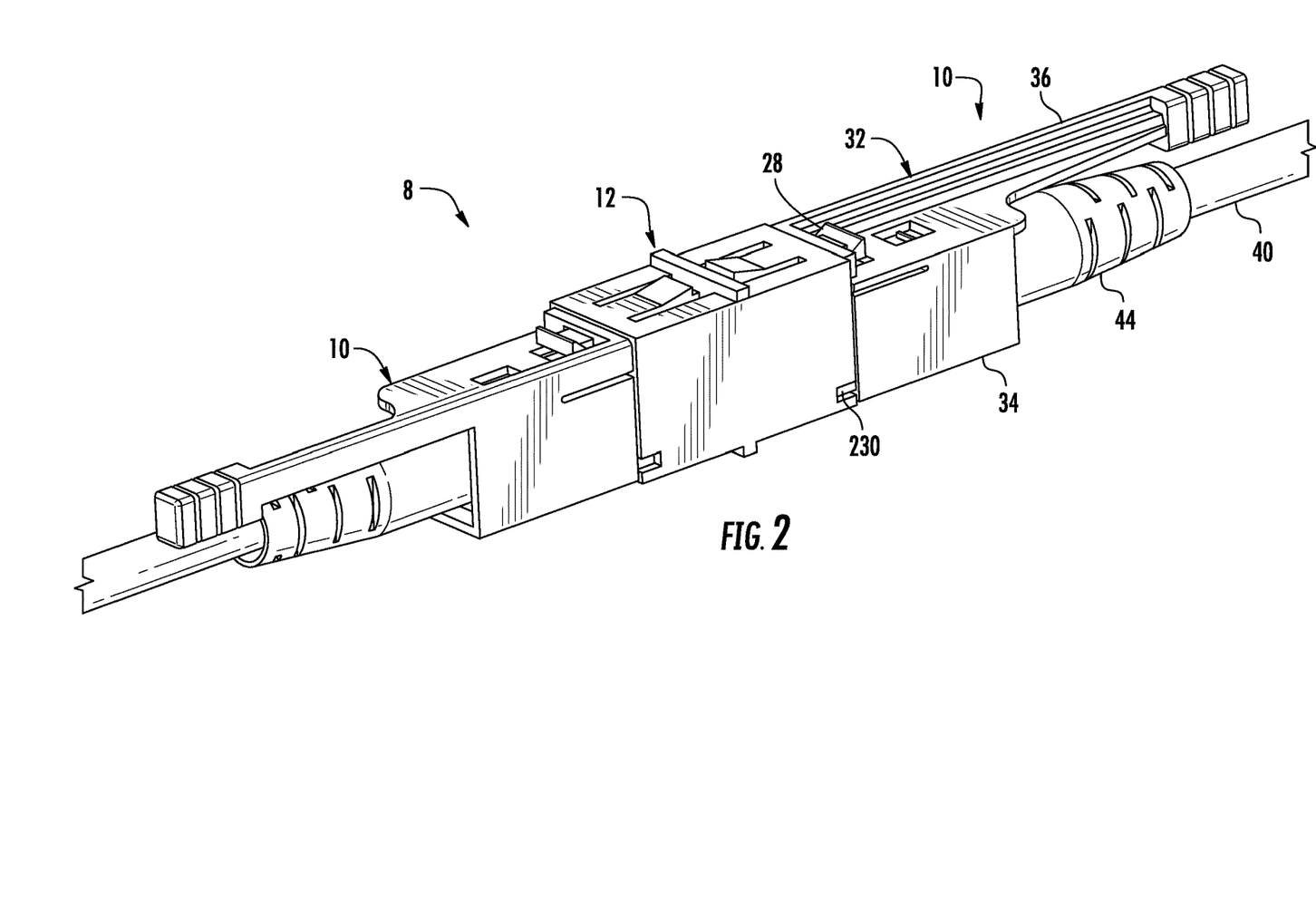
FIG. 2 is a perspective view of the fiber optic connector system of FIG. 1, wherein the fiber optic connectors are shown inserted into the adapter.

Various embodiments will be further clarified by examples in the description below. To this end, FIG. 1 illustrates one example of a fiber optic connector system 8 ("system") including at least one fiber optic connector 10 (also referred to as "optical connector 10", or simply "connector 10") and an adapter 12. The adapter 12 may be used to mate two of the connectors 10, as shown in FIG. 2. The connector 10 and adapter 12 will each be discussed in further detail below.

Figure 3:
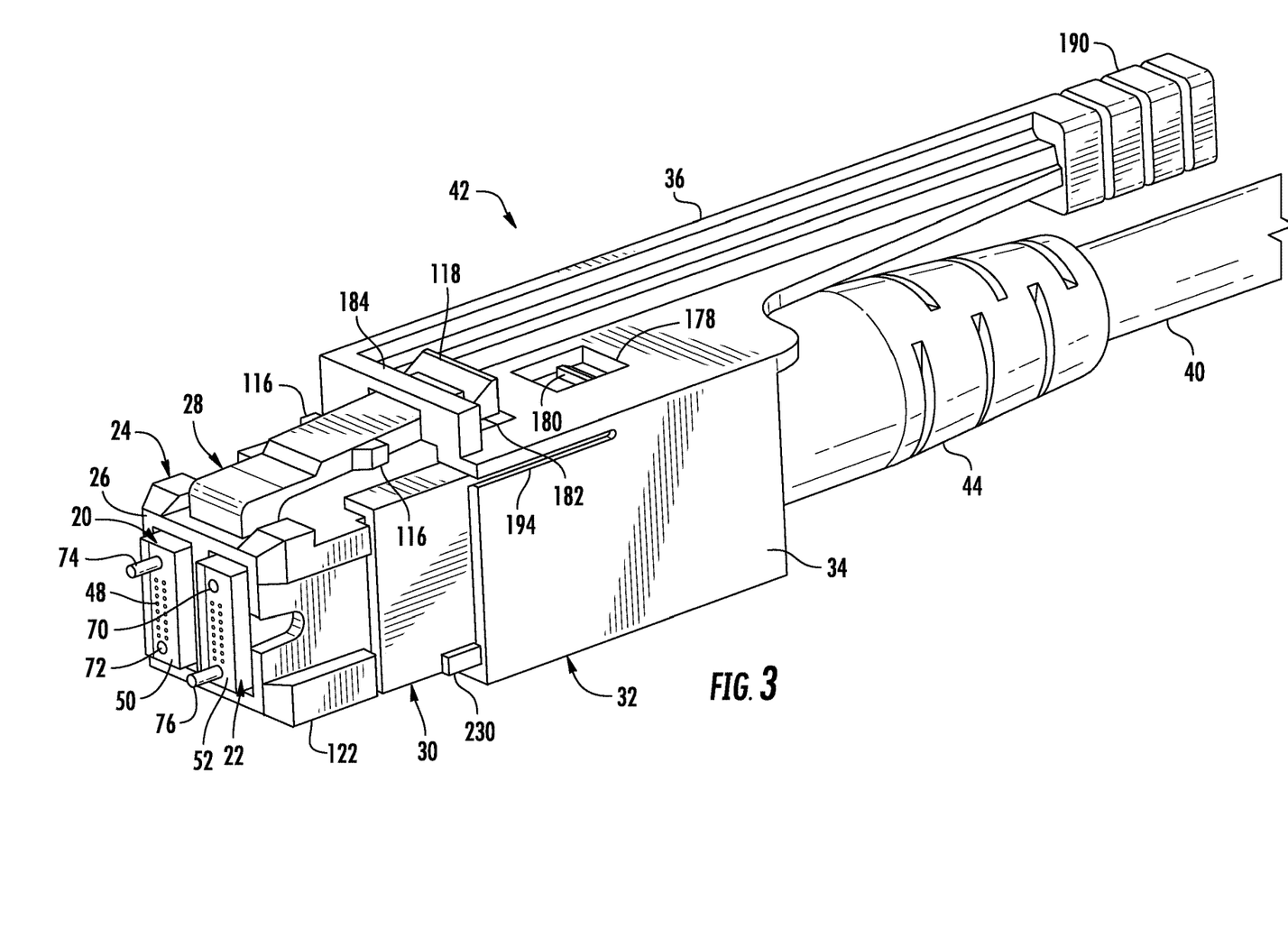
FIG. 3 is a perspective view of one of the fiber optic connectors used in the system of FIGS. 1 and 2.

Referring to FIG. 3, the connector 10 includes first and second ferrules 20, 22 arranged next to each other, an inner connector body 24 having a front end 26 from which the first and second ferrules 20, 22 extend, a latch arm 28 extending outwardly from the inner connector body 24, a rear connector body 30 received over a back portion of the inner connector body 24, and an outer body 32 that cooperates with the inner connector body 24, latch arm 28, and rear connector body 30. More specifically, the outer body 32 includes a housing portion 34 in which the inner connector body 30 is at least partially received and a handle 36 extending rearwardly from the housing portion 34. As will be described in greater detail below, the outer body 32 can move relative to the inner connector body 24 and rear connector body 30 so that the housing portion 34 can cause the latch arm 28 to flex toward the inner connector body 24. Eventually engagement between the rear connector body 30 and outer body 32 prevents further relative movement of the outer body 32 in a rearward direction. Pulling the handle 36 of the outer body 32 at this point results in the rear connector body 30 (and the inner connector body 24 that is coupled to the rear connector body 30) moving with the outer body 32 so that the connector 10 can be removed from the adapter 12.

FIG. 3 illustrates the connector 10 as being mounted on a cable 40, thereby forming a cable assembly 40. To this end, the connector 10 also includes a boot 44 coupled to the rear connector body 30 and extending over a portion of the cable 40 to help limit bending where the connector 10 is mounted on the cable 40. The first and second ferrules 20, 22 each include a plurality of bores 48 (also referred to as "micro-holes") that support respective optical fibers (not shown in FIG. 3) extending from within the cable 40 (i.e., the optical fibers extend from the cable 40, through the rear connector body 30 and inner connector body 24, and into the bores 48 of the first and second ferrules 20, 22).

Figure 4:
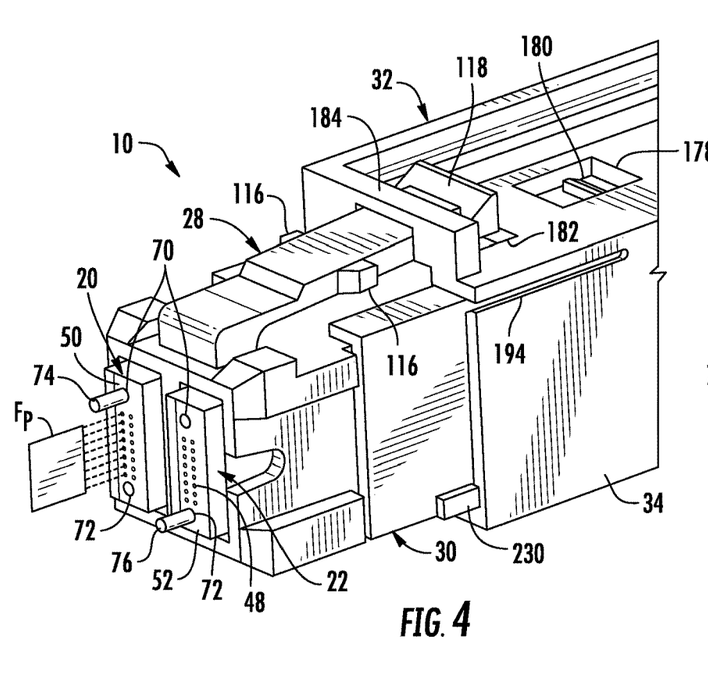
FIG. 4 is close-up perspective view a front portion of the fiber optic connector of FIG. 3, wherein the fiber optic connector includes first and second ferrules having respective first and second end faces.

FIG. 4 is a close-up perspective view of a front portion of the connector 10. In the embodiment shown, the first and second ferrules 20, 22 each include two rows of the bores 48. Although 8 bores are illustrated in each row, in alternative embodiments each row may include a greater number of bores (e.g., 12 or 16 bores) or less bores (e.g., 4 bores). Similarly, there may be a single row of bores or more than two rows of bores in alternative embodiments. Any combination of M rows×N bores is possible (e.g., 1×N, 2×N, 3×N, . . . M×N), although it may advantageous to use arrangements which are already available and used with different connector designs. For example, the first and second ferrules 20, 22 may each be a mechanical transfer (MT) ferrule like those used in known multi-fiber push-on (MPO) connectors.

Figure 5:
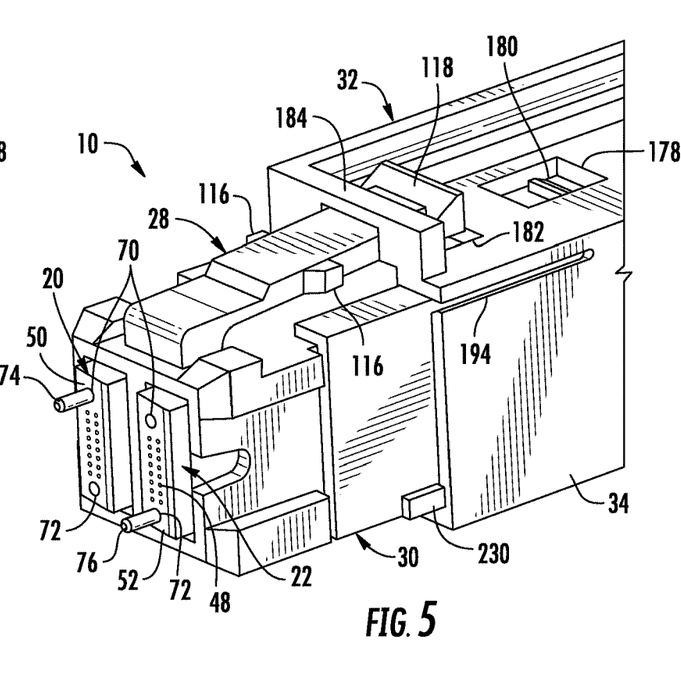
FIG. 5 is similar to FIG. 4, but illustrates an alternative embodiment where the fiber optic connector includes first and second ferrules having respective first and second end faces with a different arrangement than what is shown in FIG. 4.

The bores 48 in each row extend parallel to each other through at least a portion of the associated first or second ferrule 20, 22. As such, each row defines a respective fiber plane $F_P$, one of which is schematically illustrated in FIG. 4. The first and second ferrules 20, 22 include respective first and second end faces 50, 52 that are inclined (i.e., non-perpendicular) relative to the fiber planes defined by their respective bores 48. For example, the first and second end faces 50, 52 may be angle polished to result in the geometry shown. The polishing may be the same such that first end face 50 has the same geometry (e.g., slope/angle) as the second end face 52. In the embodiment shown in FIG. 4, a "high" end of the first and second end faces 50, 52 is on the left side of the first and second ferrules 20, 22, and a "low" end of the first and second end faces 50, 52 is on a right side of the first and second ferrules 20, 22. An alternative embodiment with an opposite arrangement is shown in FIG. 5, where the high end of the first and second end faces 50, 52 is on the right side of the first and second ferrules 20, 22, and the low end is on the left side. Either arrangement results in the first and second end faces 50, 52 having geometries that match those of a mating connector. That is, when a mating connector having the same design as the connector 10 is turned 180 degrees to face the connector 10, the first and second end faces 50, 52 of the two connectors will have complementary geometry to allow close physical contact and, therefore, facilitate optical coupling between optical fibers carried by the first and second ferrules 20, 22.

Figure 6:
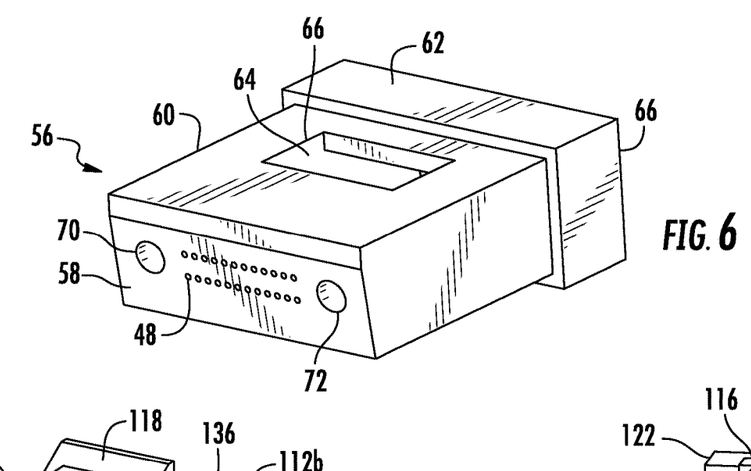
FIG. 6 is a perspective view of an exemplary ferrule for use in fiber optic connectors according to some embodiments of this disclosure.

In some embodiments, the first and second ferrules 20, 22 may alternatively have a flat polish. For example, FIG. 6 illustrates one example of a ferrule 56 that may be used as the first and second ferrules. The ferrule 56 includes an end face 58 that is perpendicular or substantially perpendicular (e.g., within +/−1 degree of perpendicular) to the fiber planes defined by the rows of bores 48. Other features of the ferrule 56 seen in FIG. 6 may apply to the first and second ferrules 20, 22 of FIGS. 3 and 4. In particular, the end face 58 is defined on a front portion 60 ("shank") of the ferrule 56 that extends from a rear portion 62 ("shoulder") of the ferrule 56. The rear portion 62 has a greater cross-sectional profile in a plane transverse to the fiber planes so that the ferrule 56 can be retained within the inner connector body 24 (see discussion below). The bores 48 extend from the end face 58 to a cavity 64 that begins in the front portion 60 and extends through the rear portion 62 to a rear opening (not shown) on a rear surface 66 of the ferrule 56. A window 68 may be provided on an outer surface of the front portion 60 to assist with placing adhesive in the cavity 64 when securing the ferrule 56 to optical fibers.

Still referring to FIG. 6, the ferrule 56 further includes first and second pin holes 70, 72 extending through the ferrule 56 on opposite sides of the rows of bores 48. Thus, the bores 48 are positioned between the first and second pin holes 70, 72. The first and second pin holes 70, 72 are each designed to accommodate a guide pin (not shown in FIG. 6). For example, referring back to FIGS. 3 and 4, the connector 10 may include a first guide pin 74 extending through the first pin hole 70 in the first ferrule 20 and a second guide pin 76 extending through the second pin hole 72 in the second ferrule 22. The first and second pin holes 70, 72 may be considered as respective "upper" and "lower" pin holes when the connector 10 is assembled. Alternative embodiments are possible where the first guide pin 74 extends through the second (i.e., lower) pin hole 72 in the first ferrule 20, and the second guide pin 76 extends through the first (i.e., upper) pin hole 70 in the second ferrule 22. Either arrangement results in the first and second ferrules 20, 22 each having a single guide pin extending therethrough.

Figure 7:
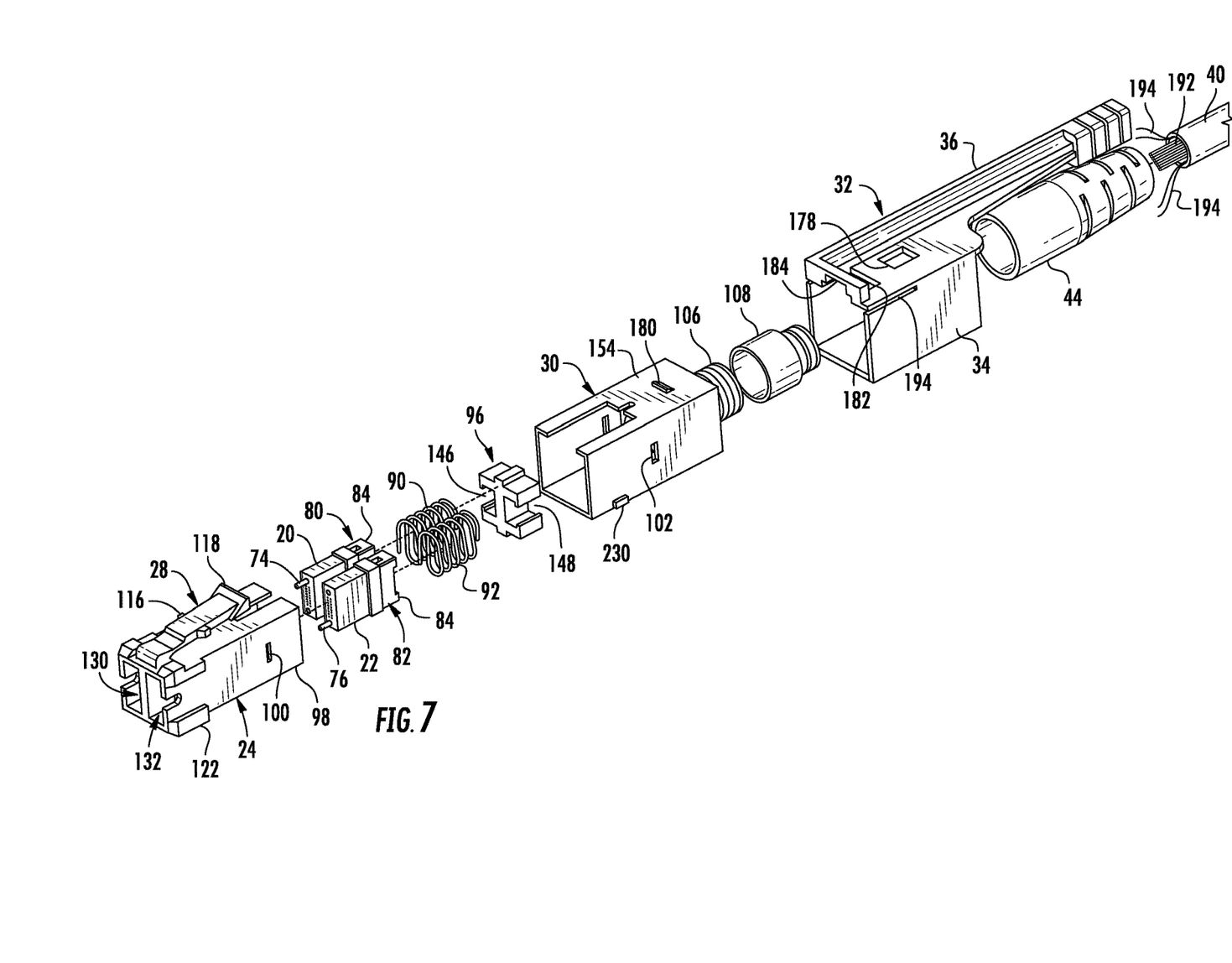
FIG. 7 is an exploded perspective view of the fiber optic connector of FIG. 3.

As shown in FIG. 7, the first and second guide pins 70, 72 may be part of respective first and second guide pin assemblies 80, 82 that each include a pin keeper 84 ("pin retainer") from which the associated guide pin (i.e., the first guide pin 70 or second guide pin 72) extends. Features on the pin keeper 84 cooperate with features on the associated guide pin to retain a portion of the guide pin within the pin keeper 84. When the connector 10 is assembled, the pin keepers 84 are positioned against the rear surfaces 66 of the first and second ferrules 20, 22, and the first and second guide pins 74, 76 extend through the associated pin holes 70, 72 so as to project beyond the first and second end faces 50, 52.

Still referring to FIG. 7, the connector further includes first and second springs 90, 92 for biasing the respective first and second ferrules 20, 22 toward the front end 26 of the inner connector body 24. The first and second springs 90, 92 each extend between one of the pin keepers 84 and a spring push 96 that is received in the rear connector body 30 when the connector 10 is assembled. Additional details related to the spring push 96 and assembly of the connector 10 in general will be described in greater detail below. However, it can be appreciated from FIGS. 3 and 7 that the rear connector body 30 being coupled to the inner connector body 24 results in the first and second springs 90, 92 extending within the inner connector body 24 and rear connector body 30, biasing the first and second ferrules 20, 22 in a forward direction.

The rear connector body 30 may be coupled to the inner connector body 24 in any suitable manner. In the embodiment shown, the rear connector body 30 is designed to be snapped onto a back portion 98 of the inner connector body 24. Latching features in the form of bumps 100 (e.g., ramped shoulders) are provided on the back portion 98 of the inner connector body 24. The rear connector body 30 is designed to receive the back portion 98 and includes openings/holes 102 (e.g., holes) that cooperate with the bumps 100 to couple the inner connector body 24 to the rear connector body 30. In other words, the rear connector body 30 can be inserted over the back portion 98, flexing as needed to accommodate the bumps 100, until the bumps 100 are received in or otherwise engage the openings 102. At this point the rear connector body 30 flexes (e.g., snaps) back towards an un-flexed shape. The bumps 10 are designed so that the rear connector body 30 cannot easily be pulled back over the bumps 100 and off the back portion 98 of the inner connector body 24.

FIG. 7 also illustrates the rear connector body 30 including a knurled portion 106. The knurled portion 106 may be integrally formed with the remainder of the rear connector body 30 as a monolithic structure. Alternatively, the knurled portion 106 may be formed separately and coupled to the rear connector body 30 by any suitable method (e.g., the knurled portion 106 may be a metal sleeve coupled to the rear connector body 30 by inserting molding techniques). Strength members 194 (e.g., aramid yarn) from the cable 40 may be placed over the knurled portion 106 and secured in place using a crimp band or tube 108. The boot 44 extends over the crimp tube 108 to abut the rear connector body 30 when the connector 10 is assembled.

Figure 8:
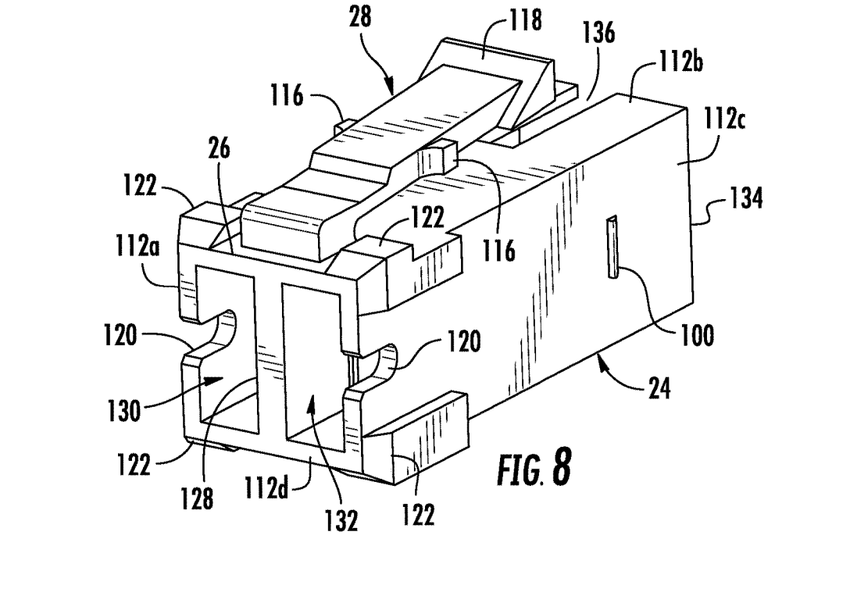
FIG. 8 is a front perspective view of an inner connector body of the fiber optic connector of FIG. 3.

Various components of the connector that have been introduced will now be described in further detail, beginning with the inner connector body 24. As shown in FIG. 8, the inner connector body 24 may be a generally rectangular body defined by side walls 112a-112d (i.e., the side walls define sides of the rectangular body in the embodiment shown). The fiber planes $F_P$ (see FIG. 4) are positioned between the side walls 112a, 112c and intersect the side walls 112b, 112d when the connector 10 is assembled. Indeed, the side walls 112a, 112c may be generally parallel to the fiber planes $F_P$ when the connector 10 is assembled, and the side walls 112b, 112d) may be generally perpendicular to the fiber planes $F_P$. The latch arm 28 extends from the side wall 112b. In some embodiments, the latch arm 28 itself may even intersect one or more of the fiber planes $F_P$ when the connector 10 is assembled.

The latch arm 28 may be integrally formed with the inner connector body 24 (e.g., as a monolithic structure), as shown. Because the latch arm 28 extends outwardly and rearwardly, a space is defined between the latch arm 28 and the inner connector body 24. The space accommodates flexing of the latch arm 28 toward the inner connector body 24. To this end, the latch arm 28 is coupled to the inner connector body 24 in a manner that allows the latch arm 28 to flex toward the inner connector body 24 when a downward force is applied to the latch arm 28 (e.g., when the latch arm 28 is depressed).

Still referring to FIG. 8, the latch arm 28 has a generally uniform width until connector latches 116 ("latching features") project laterally on opposite sides of the latch arm 28. The connector latches 116 in the embodiment shown are shoulders that define rearward-facing surfaces. The latch arm 28 also includes a ramp 118 spaced rearward from the connector latches 116. In other words, the connector latches 116 are located on an intermediate portion of the latch arm 28 (i.e., between where the latch arm 28 extends from the side wall 112b of the inner connector body 24 and the ramp 118, which defines a terminal end of the latch arm 28 in the embodiment shown).

Only a single latch arm 28 is provided in the embodiment shown, although embodiments with multiple latch arms are also possible. To facilitate discussion for the embodiment shown, the side wall 112b of the inner connector body 24 from which the latch arm 28 extends may be referred to as a "top side wall" (or "top side") of the inner connector body 24. The opposite side wall 112d may then be referred to as a "bottom side wall", and the side walls 112a, 112c as "lateral side walls". The lateral side walls 112c each include a guide slot extending rearwardly from the front end 26 of the inner connector body 24. Guide chamfers 122 are provided on the connector body 24 at corners defined the side walls 112a-112d. The guide chamfers 122 include sloped surfaces and extend rearwardly from the front end 26. As will be apparent based on the description below, the guide chamfers 122 help guide the inner connector body 24 into an adapter, and the guide slots 120 cooperate with corresponding features on the adapter during such insertion to further guide the connector 10.

Figure 9:
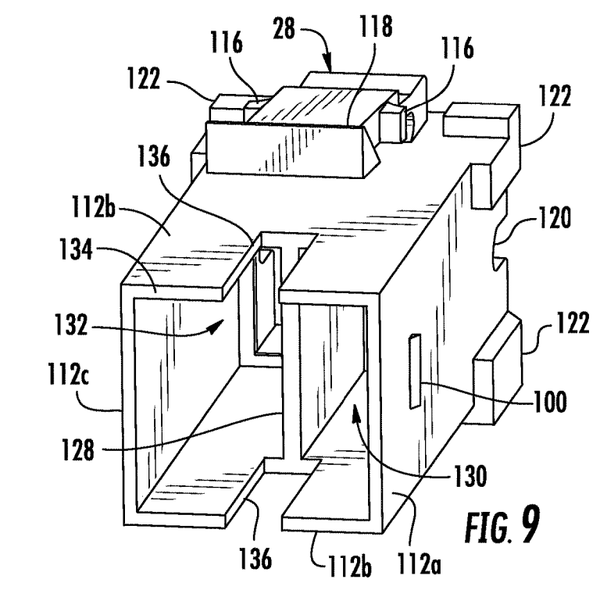
FIG. 9 is a rear perspective view of the inner connector body of the fiber optic connector of FIG. 3.

Still referring to FIG. 8, the inner connector body 24 includes an internal wall 128 that separates first and second passages 130, 132. The first and second passages 130, 132 receive the first and second ferrules 20, 22 (see, e.g., FIG. 4), respectively, when the connector 10 is assembled. FIG. 9 illustrates how the first and second ferrules 20, 22 may be inserted into the respective first and second passages 130, 132 from a back end 134 of the inner connector body 24. Each of the first and second passages 130, 132 includes a portion sized to accommodate the front portion 60 (FIG. 5) of the first and second ferrules 20, 22, but not the rear portion 62. Thus, internal geometry of the inner connector body 24 prevents the first and second ferrules 20, 22 from being inserted completely through the first and second passages 130, 132.

As shown in FIGS. 8 and 9, the internal wall 128 extends from the front end 26 of the inner connector body 24 to a location spaced from the back end 134. Thus, there is a cavity within the inner connector body 24 between the back end 134 and the internal wall 128, communicating with both the first and second passages 130, 132. The top side wall 112*b* and bottom side wall 112*d* of the inner connector body 24 each include a slot 136 extending the length of the common cavity (i.e., the slots 136 extend from the back end 134 to the internal wall 128).

Figure 10:
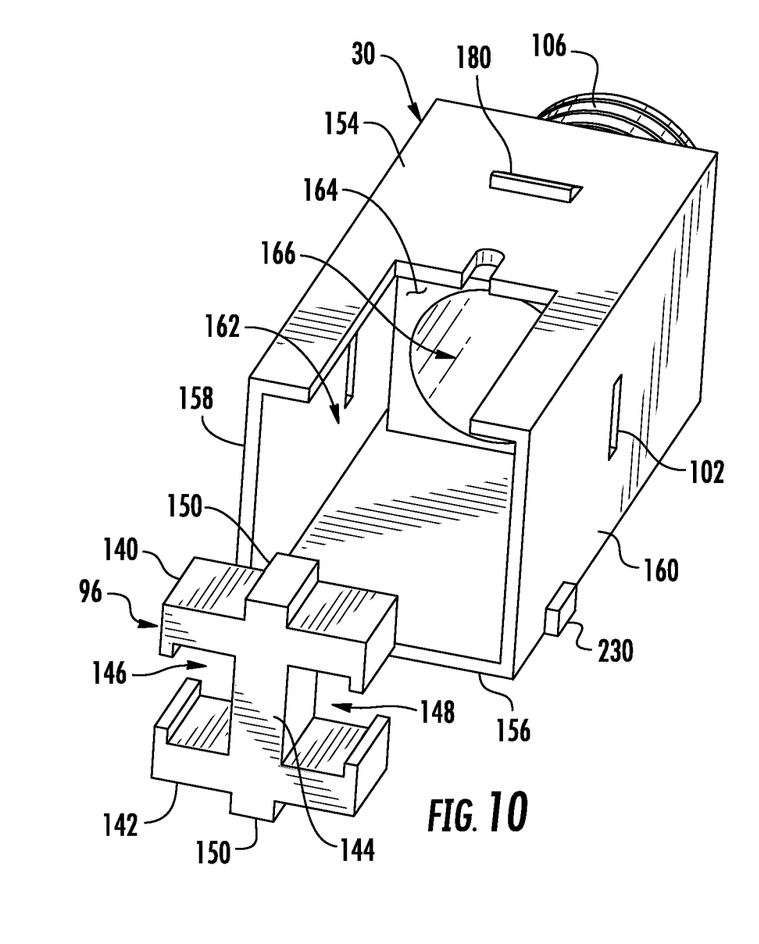
FIG. 10 is a perspective view of a spring push and a rear connector body of the fiber optic connector of FIG. 3, wherein the spring push is shown removed from the rear connector body.
Figure 11:
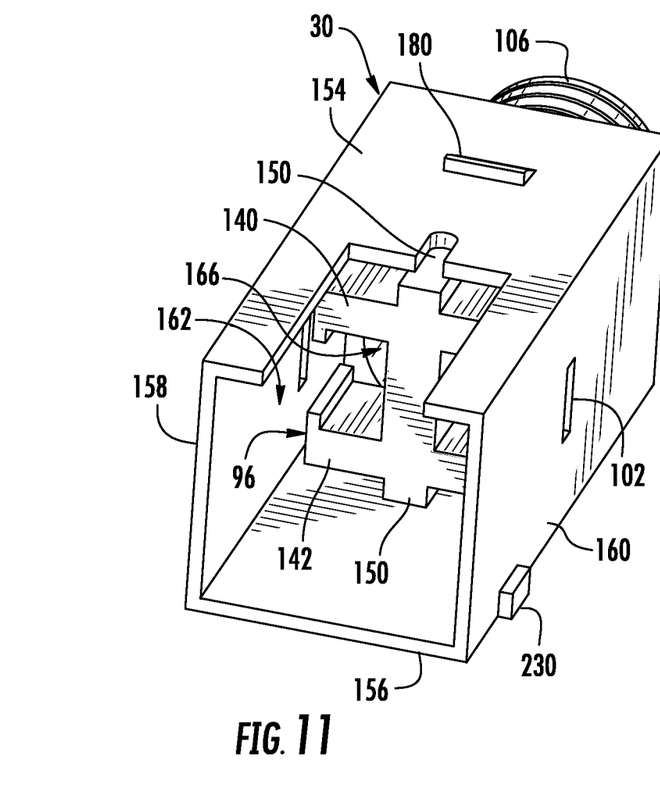
FIG. 11 is similar to FIG. 10, but illustrates the spring push received within the rear connector body.

FIGS. 10 and 11 illustrate the rear connector body 30 and spring push 96 in further detail. The spring push 96 includes upper and lower extensions 140, 142 on opposite sides of a central member 144. The upper and lower extensions 140, 142 on each side define a channel (e.g., slot) for accommodating optical fibers. Thus, the spring push 96 includes first and second channels 146, 148 for accommodating respective first and second groups of optical fibers. The spring push 96 also includes guiding members 150 (also referred to as "guiding ways" or "tabs") above the upper extension 140 and below the lower extension 142 for reasons that will be discussed below.

Like the inner connector body 24, the rear connector body 30 in the embodiment shown is generally rectangular and includes a top side wall 154, a bottom side wall 156, and lateral side walls 158, 160. An internal cavity 162 of the rear connector body 30 accommodates both the spring push 96 and the back portion 98 (FIG. 7) of the inner connector body 24. In particular, the spring push 96 may be inserted into the internal cavity 162 until a rearward-facing surface on the spring push 96 contacts a forward-facing surface 164 in the internal cavity 162. A passage 166 that defines a smaller opening than the internal cavity 162 extends from the forward-facing surface 164 and through a remainder of the rear connector body 30 (including the knurled portion 106). The first and second channels 146, 148 of the spring push 96 have portions that overlap the passage 166 when the connector 10 is assembled so that optical fibers can extend from the cable 40 (see FIG. 7), through the rear connector body 30, through first and second springs 90, 92, and to the first and second ferrules 20, 22 in the inner connector body 24. A forward-facing surface of the spring push 96 defines a spring seat for the first and second springs 90, 92. In other words, the first and second springs 90, 92 can abut or otherwise rest against the forward-facing surface of the spring push 96 so that the first and second springs 90, 92 can bias the first and second ferrules 20, 22 forward in the inner connector body 24.

In FIG. 11, it can be seen how the guiding members 150 on the spring push 96 may contact inner surfaces the top side wall 154 and bottom side wall 156 of the rear connector body 30 in the assembled position. Such an arrangement helps stabilize the spring push 96 before the rear connector body 30 is received over the inner connector body 24. The spring push 96, however, does not interfere with the internal cavity 162 accommodating the back portion 98 (FIG. 7) of the inner connector body 24. This is because the side walls 112*a*-112*d* on the inner connector body 24 can extend into portions of the internal cavity 162 between the remainder of the spring push 96 and the side walls 154, 156, 158, 160 of the rear connector body 30, with the guiding members 150 being received in the slots 136 on the top side wall 112*b* and bottom side wall 112*b* of the inner connector body 24.

Figure 12:
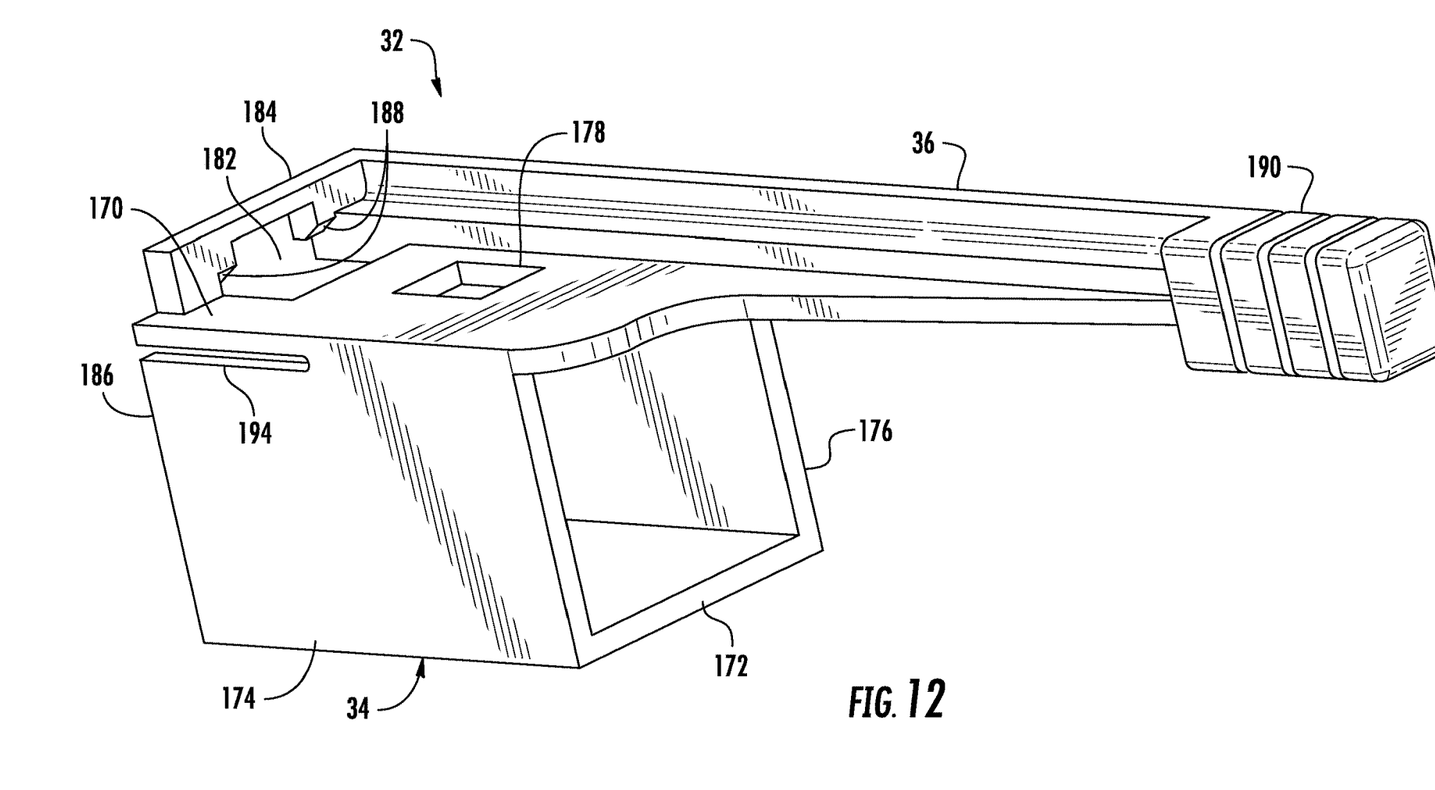
FIG. 12 is a perspective view of an outer body of the fiber optic connector of FIG. 3.

Now referring to FIG. 12, the housing portion 34 of the outer body 32 has a tubular configuration, and specifically a rectangular tubular configuration defined by a top side wall 170, bottom side wall 172, and lateral side walls 174, 176. The top side wall 170 includes a window 178 (i.e., an opening through the top side wall 170) for receiving a latch 180 (FIGS. 10 and 11) of the rear connector body 30. The top side wall 170 also includes a latch opening 182 for receiving the latch arm 28 (see, e.g., FIG. 4) when the connector 10 is assembled. A crossbar member 184 extends across the latch opening 182 at a front end 186 of the outer body 32 and includes downwardly-facing, sloped (i.e., angled) surfaces 188 for cooperating with the ramp 118 (FIG. 8) on the latch arm 28. The handle 36 extends rearwardly from the housing portion 34, as mentioned above. If desired, the handle 36 may include a cube 190 or other gripping member for a user to grasp at a terminal end of the handle 36.

Now that the components of the connector 10 have been described in further detail, a brief summary of how the connector 10 may be assembled on a cable will be provided before proceeding to the discuss features of the adapter 12. Referring back to FIG. 7, an exemplary assembly process may involve placing the boot 44, outer body 32, crimp tube 108, and rear connector body 30 onto the cable 40. The end of the cable 40 may then be prepared to form the cable assembly 42 (FIG. 3). This may include separating the optical fibers 192 into first and second groups, and even separating the optical fibers 192 within each of the first and second groups into sub-groups, or rows, to prepare the optical fibers 192 for insertion into the bores 48 in the respective first and second ferrules 20, 22. The manner in which the optical fibers 192 are separated and prepared will depend on the design of the cable 40. The cable 40 may, for example, include optical fiber ribbons (i.e., groups of the optical fibers 192 in a ribbonized form) or loose optical fibers. Appropriate techniques for separating and preparing the optical fibers 192 for insertion into the first and second ferrules 20, 22 will be appreciated by persons skilled in optical cable assembly processes.

At this point, the first and second springs 90, 92 may be placed over the first and second groups of optical fibers, which may then be inserted into and secured to the respective first and second ferrules 20, 22 using known processes. After forming these cable sub-assemblies, the first and second ferrules 20, 22 may be polished or otherwise processed. Because the inner connector body 24 has not yet been installed, the first and second ferrules 20, 22 can be accessed and handled with greater ease compared to when the connector 10 is fully assembled.

Before or after securing the optical fibers to the first and second ferrules 20, 22, the spring push 96 may be positioned onto the optical fibers at a location behind the first and second springs 90, 92. The first and second channels 146, 148 of the spring push 96 accommodate the first and second groups of the optical fibers, as noted above. The rear connector body 30 may then be moved forward over the spring push 96. Also, the inner connector body 24 may be installed onto the cable 40 by inserting the first and second ferrules 20, 22 into the respective first and second passages 130, 132 of the inner connector body 24. Ultimately the inner connector body 24 is inserted into and coupled to the rear connector body 30 in the manner described above.

Next, the cable 40 may be secured to the rear connector body 30. For example, strength members 194 (e.g., aramid yarn) from the cable 40 may be crimped or otherwise secured to the knurled portion 106 of the rear connector body 30 using the crimp tube 108. The boot 44 may then be moved forward over crimp tube 108 to abut the rear connector body 30, as mentioned above.

Before or after securing cable 40 to the rear connector body 30, the outer body 32 may be moved forward so that the rear connector body 30 and back portion 98 of the inner connector body 24 are received in the housing portion 32 of the outer body 30. The latch opening 182 on the housing portion 34 is wide enough to accommodate the latch arm 28, although it may be necessary to flex the latch arm 28 toward the inner connector body 24 so that the crossbar member 184 moves over the latch arm 28. Eventually the latch 180 on the top side wall 154 of the rear connector body 30 extends through the window 178 in the housing portion 34 of the outer body 32. Slots 194 may be provided on the lateral side walls 174, 176 of the housing portion 34 to facilitate the outer body 32 flexing when moving over the latch 180 on the rear connector body 30.

Figure 13:
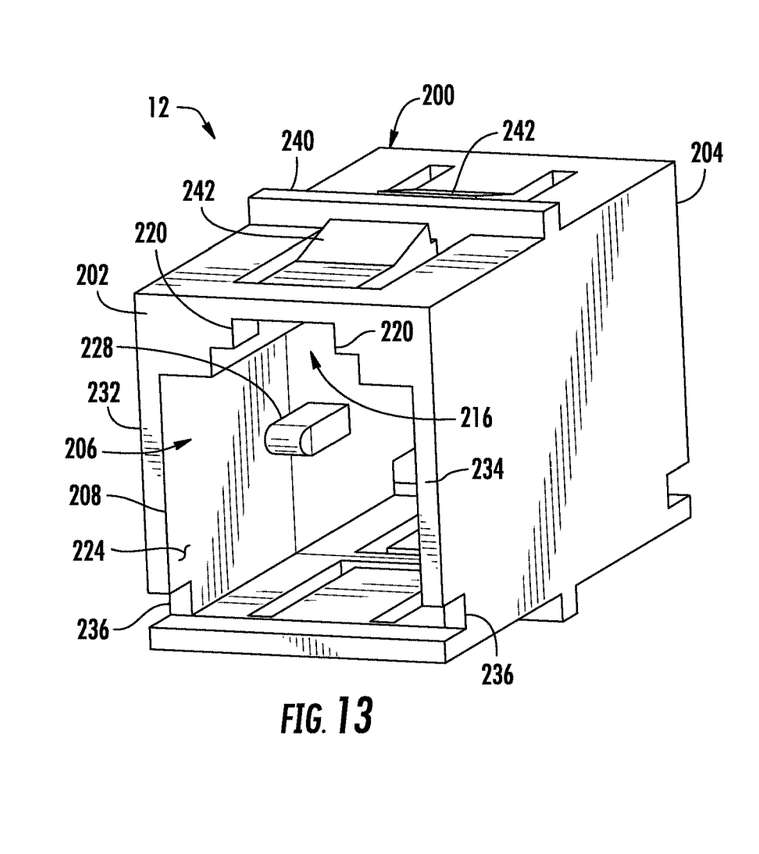
FIGS. 13 and 14 are different perspective views of the adapter used in the system of FIGS. 1 and 2.
Figure 14:
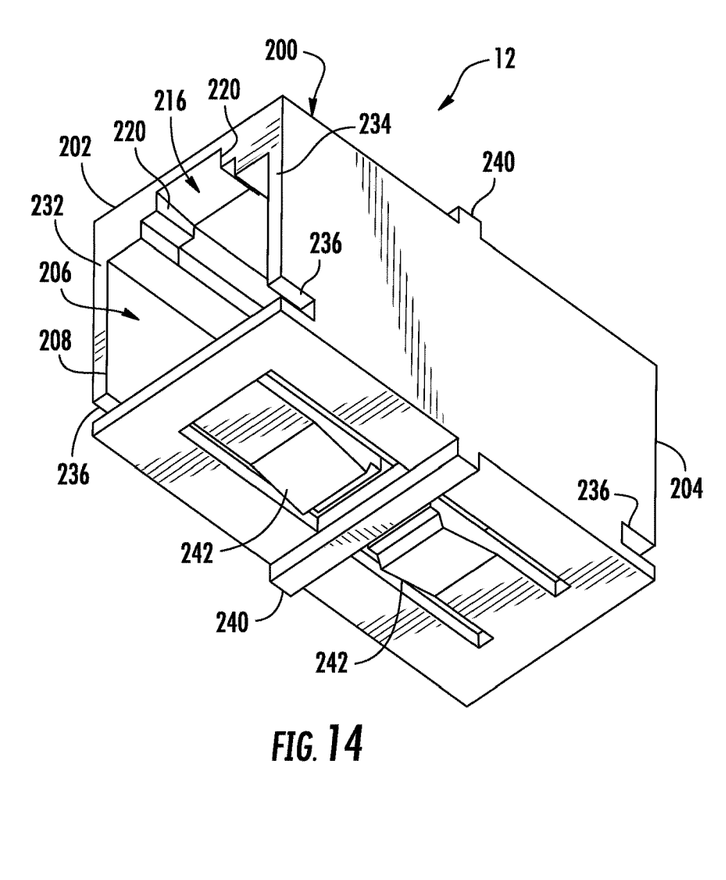

As mentioned above in connection with FIGS. 1 and 2, the connector 10 may be part of a system 14 that also includes the adapter 12. FIGS. 13 and 14 are different perspective views of an example embodiment of the adapter 12, which includes an adapter body 200 having opposed first and second ends 202, 204. A passage 206 extends through the adapter body 200 between the first and second ends 202, 204, resulting in a first opening 208 and second opening (not seen in FIGS. 13 and 14) into the passage 206 at the first and second ends 202, 204. The adapter 12 also includes respective keyways 216 extending into the adapter body 200 from the respective first and second ends 202, 204. Each keyway 216 is open to the passage 206 and configured to accommodate the latch arm 28 of the connector 10 when the connector 10 is inserted into the passage 206 via the first opening 208 or second opening. As can be appreciated, the connector 10 can be inserted into the passage 206 from either of the first and second ends 202, 204.

Adapter latches 220 are provided in upper corners of each keyway 216 at the first and second ends 202, 204 of the adapter body 200. The adapter latches 220 are essentially portions of the adapter body 200 that extend into a front, upper region of the associated keyway 216 to provide interference with the connector latches 116 (FIG. 8) on the latch arm 28. A lower region of each keyway 216 remains wide enough to accommodate the width of the latch arm 28 defined by the connector latches 116. Thus, when the connector 10 is inserted into the passage 206 via the first opening 208 or second opening, the latch arm 28 can flex toward the inner connector body 24 so that the connector latches 116 can pass under the adapter latches 220 in the lower region of the associated keyway 216. Once the connector latches 116 clear the adapter latches 220, the latch arm 28 can flex back away from the inner connector body 24 so that the connector latches 116 are moved into the upper region of the associated keyway 216, behind the associated adapter latches 220. Such an arrangement prevents the connector 10 from being pulled back out of the passage 206 unless the latch arm 28 is once again flexed toward the inner connector body 24.

Still referring to FIG. 13, the adapter body 200 includes at least one inner surface 224 having a guiding member 226 ("guiding way") projecting into the passage 206. Each guiding member 226 is received in one of the guide slots 120 (FIG. 8) on the lateral side walls 112a, 112b of the inner connector body 24 when the connector 10 is inserted into the adapter 12. As can be appreciated, the guiding member(s) 226 cooperate with the guide slots 120 to help position the connector 10 within the passage 206, thereby facilitating alignment between pairs of connectors that are mated using the adapter 12. Indeed, the adapter 12 need not include any additional alignment sleeve or the like within the passage 206.

Engagement between the guiding members 226 and the guide slots 120 may limit the extent to which the connector 10 can be inserted into the passage 206 from either the first end 202 or second end 204 of the adapter body 200. Alternatively or additionally, bumps 230 (FIGS. 10 and 11) on the lateral side walls 158, 160 of the rear connector body 30 may engage a portion of the adapter body 200 to limit such insertion. For example, opposed first and second side walls 232, 234 of the adapter body 200 may each include slots 236 at the first and second ends 202, 204 of the adapter body 200. Inserting the connector 10 into the passage 206 results in each bump 230 on the rear connector body 30 being received in one of the slots 236. The bumps 230 may "bottom out" in the slots 236, thereby preventing further insertion of the connector 10.

The adapter in the embodiment shown is generally symmetrical, with a first portion including the first end 202 of the adapter body 200 and a second portion including the second end 204 of the adapter body 200. An adapter flange 240 is positioned between the first and second portions in a central section of the adapter body 200. Each of the first and second portions also includes a mount structure 242 for securing the adapter 200 to a panel, faceplate, wall, or other bulkhead having an opening for the adapter body 200. In alternative embodiments, the adapter 12 may not be symmetrical (e.g., only the first portion or second portion may include a mount structure).

The insertion of the connector 10 into the adapter 12 has already been briefly discussed. Referring back to FIGS. 1 and 2 with this discussion in mind, it can be seen how the handle 36 of the outer body 32 may be used achieve this insertion. In particular, a user may grasp the handle 36 and move the outer body 32 forward over the rear connector body 30 and inner connector body 24 until the housing portion 34 of the outer body 32 contacts the bumps 230 on the rear connector body 30. After such contact, the outer body 30 can be used to push the connector 10 into the adapter 12. The contact between the outer body 32 and bumps 230 on the rear connector body 30 may even be present initially such that the pushing begins without there first being relative movement between the outer body 32 and rear connector body 30.

Figure 15:
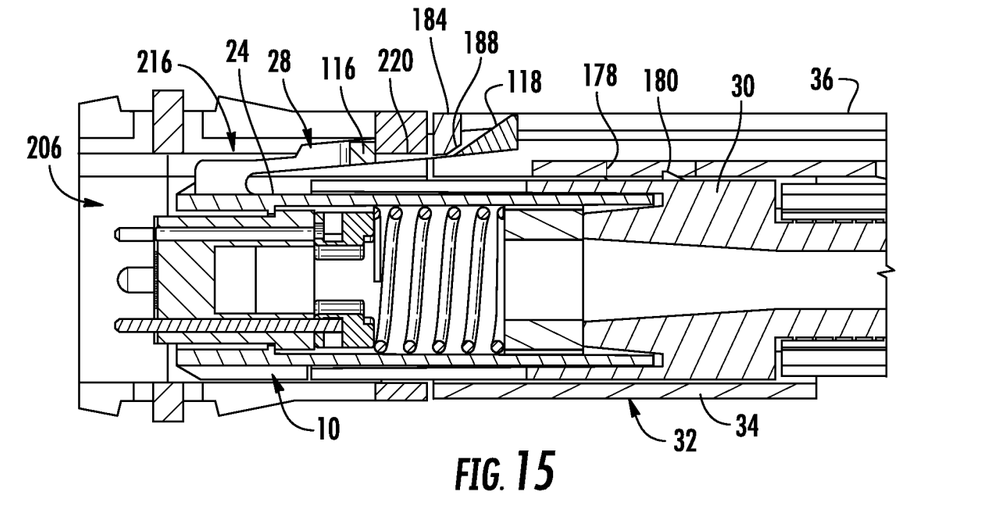
FIG. 15 is a cross-sectional side view illustrating how the fiber optic connector of FIG. 3 cooperates with the adapter of FIGS. 13 and 14 so that the fiber optic connector is retained in the adapter.

To remove the connector 10 from the adapter 12, the handle 36 may be pulled rearwardly so that the outer body 32 depresses the latch arm 28 and ultimately pulls the connector 10 from the adapter 12. FIGS. 15-18 are cross-sectional views sequentially illustrating this process and the cooperation between various features already discussed. In FIG. 15, the connector 10 is fully inserted into the passage 206 of the adapter 12. FIG. 15 shows one of the adapter latches 220 blocking rearward movement of one of the connector latches 116 to retain the connector 10 within the adapter 12. It can also be seen how the ramp 118 on the latch arm 28 is positioned behind the crossbar member 184 of the outer body 32 at this stage.

Figure 16:
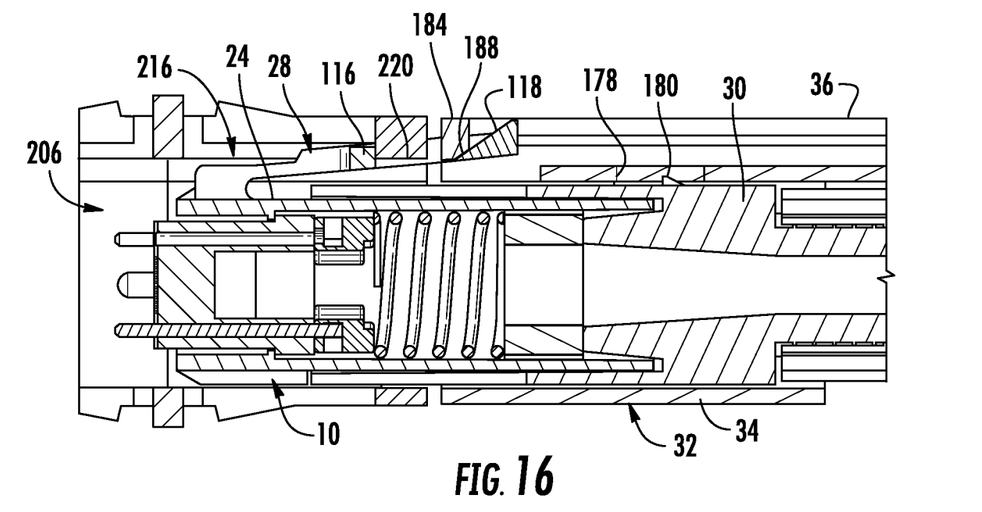
FIGS. 16-18 are similar to FIG. 15, but sequentially illustrate how the outer body of the fiber optic connector may be moved in a rearward direction to depress a latch arm of the fiber optic connector and ultimately remove the fiber optic connector from the adapter.

In FIG. 16, the outer body 30 has been moved relative to the remainder of the connector 10. More specifically, the outer body 30 has been moved in a rearward direction (e.g., by pulling the handle 36) so that the sloped surfaces 188 of the crossbar member 184 contact the ramp 118 of the latch arm 28. Further movement of the outer body 30 in the rearward direction results in the crossbar member 184 moving along the ramp 118 and causing the latch arm 28 to flex toward the inner connector body 24. Thus, the outer body 32 may be used to depress the latch arm 28.

Figure 17:
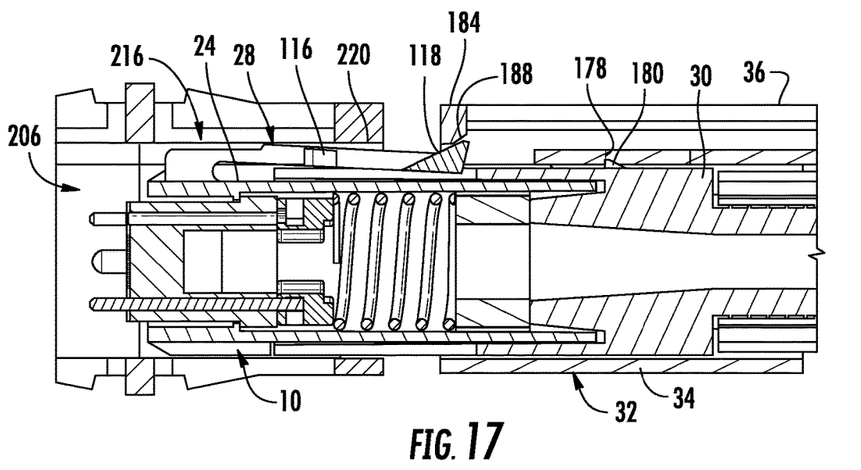

Eventually the latch 180 on the top side wall 154 of the rear connector body 30 engages the housing portion 34 of the outer body 32, as shown in FIG. 17. The engagement prevents further movement of the outer body 32 relative to the rear connector body 30 in the rearward direction. By this point, the outer body 32 has caused the latch arm 28 to flex sufficiently toward the inner connector body 24 so that the connector latches 116 are positioned in the lower region of the associated keyway 216 of the adapter 12, beneath the adapter latches 220.

Figure 18:
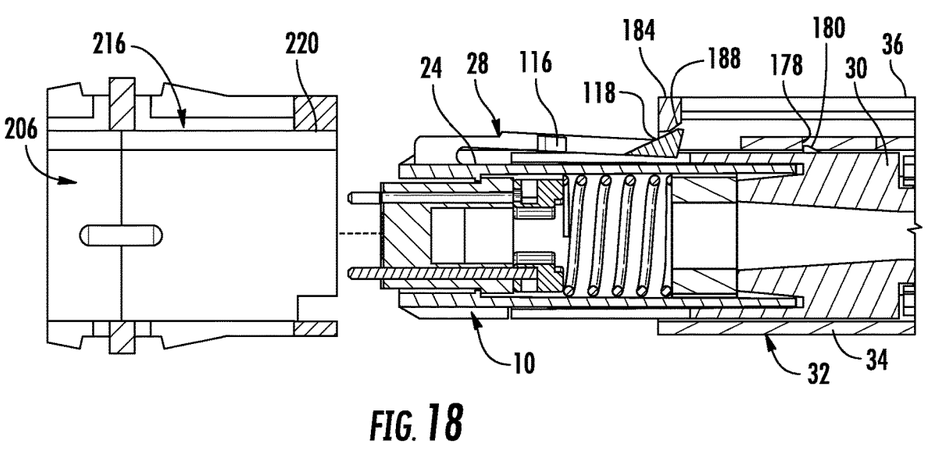

As shown in FIG. 18, the outer body 30 may then be used to pull the connector 10 out of the passage 206 of the adapter 12. In other words, continuing to pull the handle 36 of the outer body 30 in a reward direction results in the connector 10 moving as a unit in that direction. The connector latches 116 pass under the adapter latches 220 due to the depressed state of the latch arm 28.

Those skilled in optical connectivity will appreciate that other modifications and variations can be made without departing from the spirit or scope of the invention defined by the claims below. This includes modifications, combinations, sub-combinations, and variations of the disclosed embodiments. For example, although the connector 10 is has a "dual-ferrule" arrangement where only the first and second ferrules 20, 22 are arranged next to each other, embodiments will be appreciated where there are more than two ferrules arranged side-by-side. Additionally, although the ferrules described above include the bores 48 extending to the respective end faces of the ferrules, in alternative embodiments the connector 10 may include lens-based ferrules where optical fibers do not extend all the way to the ferrule end faces.

What is claimed is:

1. A fiber optic connector, comprising:
   first and second ferrules that each have a plurality of bores configured to support respective optical fibers;
   an inner connector body having a front end from which the first and second ferrules extend;
   a latch arm extending outwardly from the inner connector body;
   a rear connector body coupled to the inner connector body;
   first and second inner springs extending within the inner connector body and rear connector body, wherein the first and second inner springs bias the respective first and second ferrules toward the front end of the inner connector body; and
   an outer body having a housing portion in which the inner connector body and rear connector body are at least partially received and a handle extending rearwardly from the housing portion, wherein the outer body can move relative to the inner connector body and rear connector body to cause the latch arm to flex toward the inner connector body, and wherein the inner connector body is configured to limit forward movement of the outer body and the rear connector body is configured to limit rearward movement of the outer body such that the housing portion of the outer body is retained on the inner connector body and rear connector body despite being able to move relative thereto.

2. The fiber optic connector of claim 1, wherein the rear connector body includes a rear passage for allowing optical fibers to extend through the rear connector body and to the first and second ferrules in the inner connector body, the fiber optic connector further comprising:
   a spring push received within the rear connector body and including first and second channels communicating with the rear passage, wherein the first and second inner springs contact the spring push.

3. The fiber optic connector of claim 2, wherein the spring push includes a forward-facing surface defining respective first and second spring seats for the respective first and second inner springs.

4. The fiber optic connector of claim 2, wherein:
   the inner connector body further includes a back end opposite the front end and a plurality of side walls;
   the spring push is shaped so that the side walls of the inner connector body extend between portions of the spring push and inner surfaces of the rear connector body;
   at least one of the side walls of the inner connector body includes at least one slot extending from the back end of the inner connector body toward the front end of the inner connector body; and
   the spring push includes at least one guiding tab received in the at least one slot of the at least one side wall of the inner connector body.

5. The fiber optic connector of claim 1, wherein the rear connector body includes at least one latch configured to limit rearward movement of the outer body relative to the rear connector body.

6. The fiber optic connector of claim 5, wherein:
   the housing portion of the outer body includes side surfaces and a window through one of the side surfaces; and
   the at least one latch of the rear connector body comprises a projection on the rear connector body that extends through the window in the outer body.

7. The fiber optic connector of claim 1, wherein the rear connector body includes at least one side wall having a bump configured to limit forward movement of the outer body relative to the rear connector body.

8. The fiber optic connector of claim 1, wherein the housing portion of the outer body includes a latch opening, and wherein the latch arm extends from the inner connector body and through the latch opening of the outer body.

9. The fiber optic connector of claim 1, wherein:
   the latch arm includes at least one connector latch and a ramp spaced from the at least one connector latch; and
   the ramp facilitates the outer body being able to cause the latch arm to flex toward the inner connector body upon rearward movement of the outer body relative to the inner connector body.

10. The fiber optic connector of claim 1, wherein:
    the inner connector body includes first and second passages separated by an internal wall; and
    the first and second ferrules are received in the respective first and second passages.

11. The fiber optic connector of claim 1, wherein the plurality of bores in each of the first and second ferrules comprises at least one row of bores in each of the first and second ferrules.

12. The fiber optic connector of claim 11, wherein the bores in each row extend parallel to each other such that each row defines a respective fiber plane.

13. The fiber optic connector of claim 12, wherein the latch arm extends outwardly from a side of the inner connector body that intersects the fiber planes defined by the at least one row of bores in each of the first and second ferrules.

14. The fiber optic connector of claim 12, wherein the first and second ferrules include respective first and second end faces that are inclined relative the fiber planes defined by the at least one row of bores in the respective first and second ferrules.

15. The fiber optic connector of claim 12, wherein the first and second ferrules include respective first and second end faces that are substantially perpendicular to the fiber planes defined by the at least one row of bores in the respective first and second ferrules.

16. The fiber optic connector of claim 1, wherein the first and second ferrules each include upper and lower pin holes extending therethrough and between which the respective plurality of bores are positioned, the fiber optic connector further comprising:
a first guide pin extending through the lower pin hole in the first ferrule; and
a second guide pin extending through the upper pin hole in the second ferrule.

17. The fiber optic connector of claim 1, wherein the housing portion of the outer body comprises a tubular body.

18. The fiber optic connector of claim 1, wherein the latch arm is the only latch arm extending from the inner connector body.

19. A cable assembly, comprising:
a fiber optic cable including a plurality of optical fibers; and
a fiber optic connector mounted on the fiber optic cable, the fiber optic connector comprising:
first and second ferrules arranged next to each other, wherein the first and second ferrules each have a plurality of bores, wherein at least a first group of the plurality of optical fibers are supported by the plurality of bores in the first ferrule, and wherein at least a second group of the plurality of optical fibers are supported by the plurality bores in the second ferrule;
an inner connector body having a front end from which the first and second ferrules extend;
a latch arm extending outwardly from the inner connector body;
a rear connector body coupled to the inner connector body;
first and second inner springs extending within the inner connector body and rear connector body, wherein the first and second inner springs bias the respective first and second ferrules toward the front end of the inner connector body; and
an outer body having a housing portion in which the inner connector body and rear connector body are at least partially received and a handle extending rearwardly from the housing portion, wherein the outer body can move relative to the inner connector body and rear connector body to cause the latch arm to flex toward the inner connector body, and wherein the inner connector body is configured to limit forward movement of the outer body and the rear connector body is configured to limit rearward movement of the outer body such that the housing portion of the outer body is retained on the inner connector body and rear connector body despite being able to move relative thereto.

* * * * *